United States Patent
Konet et al.

(10) Patent No.: US 8,299,904 B2
(45) Date of Patent: Oct. 30, 2012

(54) SYSTEM AND METHOD FOR PRODUCING AN AUDIBLE ALERT FOR A VEHICLE

(75) Inventors: Heather Konet, Canton, MI (US); Tsuyoshi Kanuma, Kanagawa (JP); Manabu Sato, Farmington Hills, MI (US); Toshiyuki Tabata, Kanagawa (JP)

(73) Assignee: Nissan North America, Inc., Franklin, TN (US)

( * ) Notice: Subject to any disclaimer, the term of this patent is extended or adjusted under 35 U.S.C. 154(b) by 329 days.

(21) Appl. No.: 12/872,610

(22) Filed: Aug. 31, 2010

(65) Prior Publication Data
US 2012/0050020 A1   Mar. 1, 2012

(51) Int. Cl.
*G08B 3/00* (2006.01)
*B60Q 1/00* (2006.01)

(52) U.S. Cl. ............ 340/384.1; 340/384.3; 340/384.4; 340/425.5; 340/384.72; 381/86; 381/71.1; 701/22

(58) Field of Classification Search ............ 340/384.1, 340/384.3, 384.4
See application file for complete search history.

(56) References Cited

U.S. PATENT DOCUMENTS

| | | | |
|---|---|---|---|
| 5,237,617 A | 8/1993 | Miller | |
| 5,371,802 A | 12/1994 | McDonald et al. | |
| 5,517,173 A | 5/1996 | Cha et al. | |
| 5,635,903 A | 6/1997 | Koike et al. | |
| 5,734,726 A | 3/1998 | Truchsess | |
| 5,820,442 A | 10/1998 | Helder | |
| 5,835,605 A | 11/1998 | Kunimoto | |
| 6,275,590 B1 | 8/2001 | Prus | |
| 6,356,185 B1 | 3/2002 | Plugge et al. | |
| 6,725,150 B1 | 4/2004 | Glandian | |
| 6,859,539 B1 | 2/2005 | Maeda | |
| 7,088,829 B1 | 8/2006 | Schick et al. | |
| 7,203,321 B1 | 4/2007 | Freymann et al. | |
| 7,253,746 B2 | 8/2007 | Maekawa et al. | |
| 7,501,934 B2 | 3/2009 | Tischer | |
| 2005/0113168 A1 | 5/2005 | Maeda | |
| 2008/0094254 A1 | 4/2008 | Hill | |
| 2009/0066499 A1 | 3/2009 | Bai et al. | |

FOREIGN PATENT DOCUMENTS

| | | |
|---|---|---|
| DE | 3420463 A1 | 12/1985 |
| DE | 4326639 A1 | 2/1995 |
| DE | 19701801 A1 | 7/1998 |
| EP | 1524649 A1 | 4/2005 |
| EP | 1923865 A1 | 5/2008 |
| GB | 2261103 A | 5/1993 |
| GB | 2354872 A | 4/2001 |
| GB | 2447063 A | 9/2008 |
| JP | 04-152395 A | 5/1992 |
| JP | 06-289887 A | 10/1994 |
| JP | 11-184487 A | 7/1999 |
| JP | 11-249672 A | 9/1999 |
| WO | WO-90/13109 A1 | 11/1990 |
| WO | WO-00/12354 A1 | 3/2000 |
| WO | WO-2006/086832 A1 | 8/2006 |

*Primary Examiner* — Donnie Crosland
(74) *Attorney, Agent, or Firm* — Global IP Counselors, LLP

(57) ABSTRACT

A method for controlling a vehicle to emanate an audible alert including determining when the vehicle is operating, and controlling a speaker system in the vehicle to emanate the audible alert outside of the vehicle when the vehicle is operating based on stored information representative of an internal combustion engine (ICE) noise profile. The audible alert has a sound profile including a simultaneous emanation of first, second and third audible frequency components having first, second and third frequencies, respectively, with the first and second frequencies emanating at first and second sound pressure levels greater than first and second representative sound pressure levels of the ICE noise profile at the first and second frequencies, respectively, and the third frequency emanating at a third sound pressure level less than a third representative sound pressure level of the ICE noise profile at the third frequency.

24 Claims, 3 Drawing Sheets

SYSTEM AND METHOD FOR PRODUCING AN AUDIBLE ALERT FOR A VEHICLE

BACKGROUND

1. Field of the Invention

The present invention generally relates to a system and method for producing an audible alert for a vehicle. More specifically, the present invention relates to a system and method for emanating from a vehicle an audible alert having a sound profile that is readily detectable by pedestrians.

2. Background Information

Electric and hybrid vehicles are becoming increasingly popular for reasons such as rising fuel costs and environmental concerns. A secondary advantage of the shift toward widespread use of electric vehicles is the reduction of ambient noise which is emanated by an internal combustion engine (ICE) used in most vehicles today. With 100% electric power running the vehicle, generally only tire noise and some slight electric motor noise is generated during operation of fully electric vehicles. Although this greatly reduces noise pollution, this lack of noise can make it difficult for pedestrians to detect the presence of a vehicle. That is, pedestrians are highly reliant on ICE noise to detect the presence of vehicles, especially when the pedestrian is hearing or visually impaired.

One attempted solution to enable better pedestrian detection of the vehicle is to emit a synthetic ICE sound during operation of the vehicle, thereby enabling detection of the electric vehicle in the same way as ICE vehicles. However, ICE sound generation does not reduce noise pollution. Other attempted solutions include the use of a physical apparatus, such as a cone or wheel that drops to engage the ground to create a sound. Still other solutions use a plurality of ultrasonic fields that cross to produce an audible sound in a selected area around the vehicle. Other attempts generate sounds can include, for example, generating an unpleasant horn-like sound at an ambient noise frequency, or generating a sound having peaks at an ambient noise frequency.

SUMMARY

It has been discovered that the generation of ICE or ambient noise frequency sounds are not the most efficient way of enabling pedestrians to sense the presence of a vehicle.

In view of the state of the known technology, one aspect of the present invention provides a method for controlling a vehicle to emanate an audible alert. The method comprises determining when the vehicle is operating, and controlling a speaker system in the vehicle to emanate the audible alert. The controlling emanates the audible alert outside of the vehicle for a period of time when the vehicle is operating based on stored information that is representative of an internal combustion engine noise profile. The audible alert has a sound profile that includes a simultaneous emanation of first, second and third audible frequency components. The first audible frequency component has a first frequency emanating at a first sound pressure level that is greater than a first representative sound pressure level of the internal combustion engine noise profile at the first frequency. The second audible frequency component has a second frequency emanating at a second sound pressure level that is greater than a second representative sound pressure level of the internal combustion engine noise profile at the second frequency. The third audible frequency component has a third frequency emanating at a third sound pressure level that is less than a third representative sound pressure level of the internal combustion engine noise profile at the third frequency.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
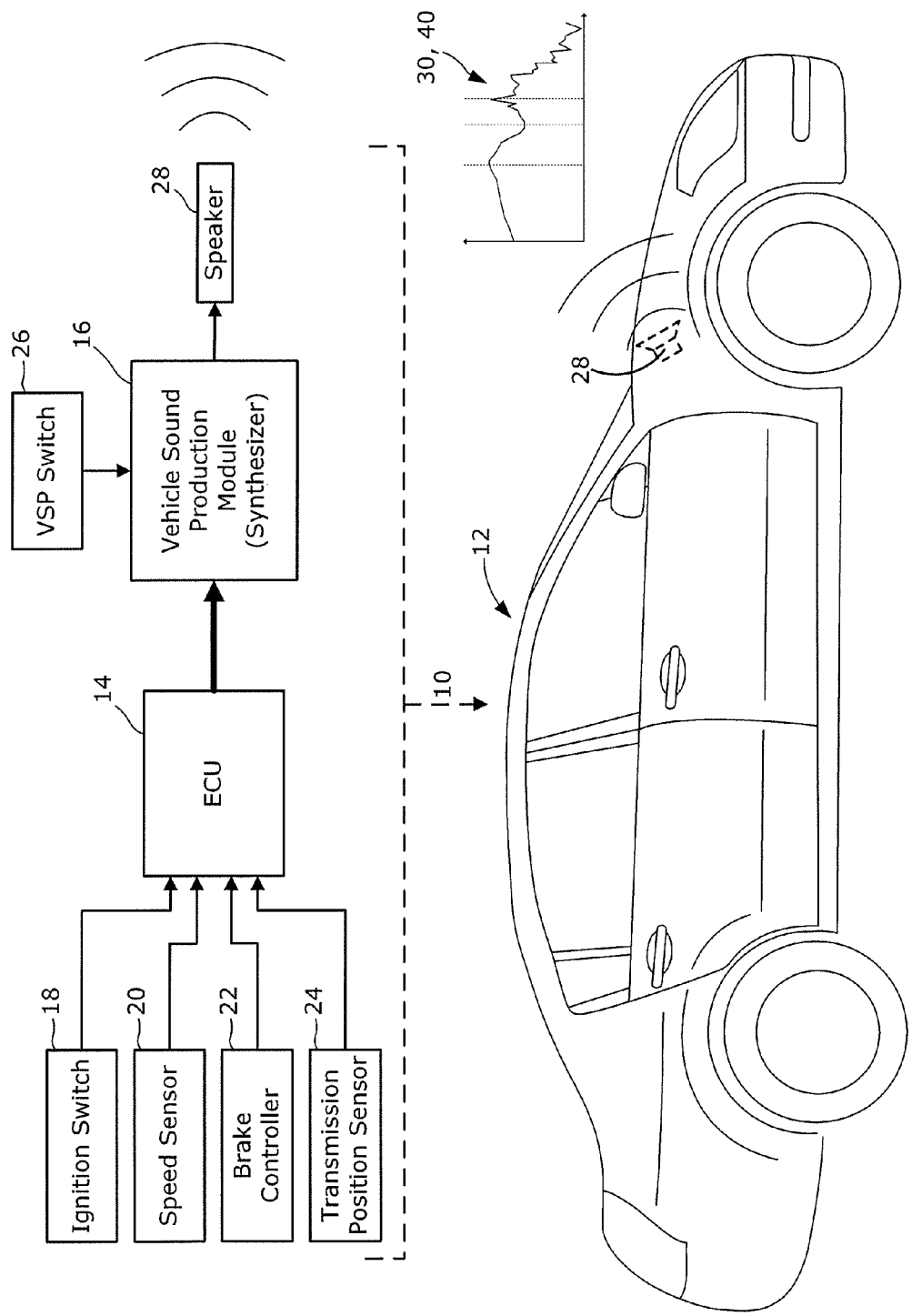
FIG. 1 is a schematic view illustrating an example of components of a system for producing an audible alert for a vehicle according to an embodiment of the present invention.

Referring initially to FIG. 1, a vehicle sound production system 10 for use in a vehicle 12 is illustrated in accordance with an embodiment of the present invention. The vehicle sound production (VSP) system 10 includes an engine control unit 14 (controller) and a vehicle sound production (VSP) module 16 that generates an audible alert as discussed in more detail below. As understood by one skilled in the art, the engine control unit 14 preferably includes a microcomputer with a control program that controls the VSP system 10 as discussed herein. The engine control unit 14 can also include other conventional components such as an input interface circuit, an output interface circuit, and storage devices such as a ROM (Read Only Memory) device and a RAM (Random Access Memory) device. The RAM and ROM store processing results and control programs that are run by the engine control unit 14. The engine control unit 14 is operatively coupled to the components of the VSP system 10, and to the components of the vehicle 12 as appropriate, in a conventional manner. It will be apparent to those skilled in the art from this disclosure that the precise structure and algorithms for the engine control unit 14 can be any combination of hardware and software that will carry out the functions of the present invention.

The engine control unit 14 receives signals from the ignition switch 18, speed sensor 20, brake controller 22 and transmission position sensor 24, and controls the VSP module 16 based on those signals as discussed in more detail below. The VSP module 16 receives on/off signals from a VSP switch 26 that enables a user to turn the VSP module 16 on and off. The VSP module 16 provides signals to at least one speaker 28 (speaker system) to cause the speaker 28 to generate an audible alert having a sound profile 30 or 40 as discussed in more detail below. Specifically, the engine control unit 14 controls the VSP module 16 to generate the sound profile 30 or 40 when the ignition switch 18 is on and the vehicle is running, the transmission position sensor 24 indicates that the vehicle 12 is in a motive gear (e.g., drive or reverse), and the speed sensor 20 indicates that the vehicle 12 is travelling forward at low speeds during which tire noise is minimal. Preferably, the engine control unit 14 controls the VSP module 16 to generate the sound profile 30 or 40 when the vehicle 12 is traveling at speeds of 25 mph or less. However, the engine control unit 14 can be configured to control the VSP module 16 to generate the sound profile 30 or 40 at any suitable vehicle speed. The sound profile 30 or 40 is a uniquely recognizable sound which, as discussed in more detail below, has a broadband sound profile and not simply pure tones. The sound profile 30 or 40 provides good detectability for pedestrians with normal hearing, such as young adults and children, good detectability for those with high frequency hearing loss, and low neighborhood community noise intrusion. That is, people over the age of 60 typically have high frequency hearing loss characterized by a significant loss in perceptibility of sounds greater than at or about 2 kHz. Hence, the sound profiles 30 and 40 should include a peak that is at least 3 dB(A) higher than the level of the ICE signal at a frequency lower than 2 kHz.

Figure 2:
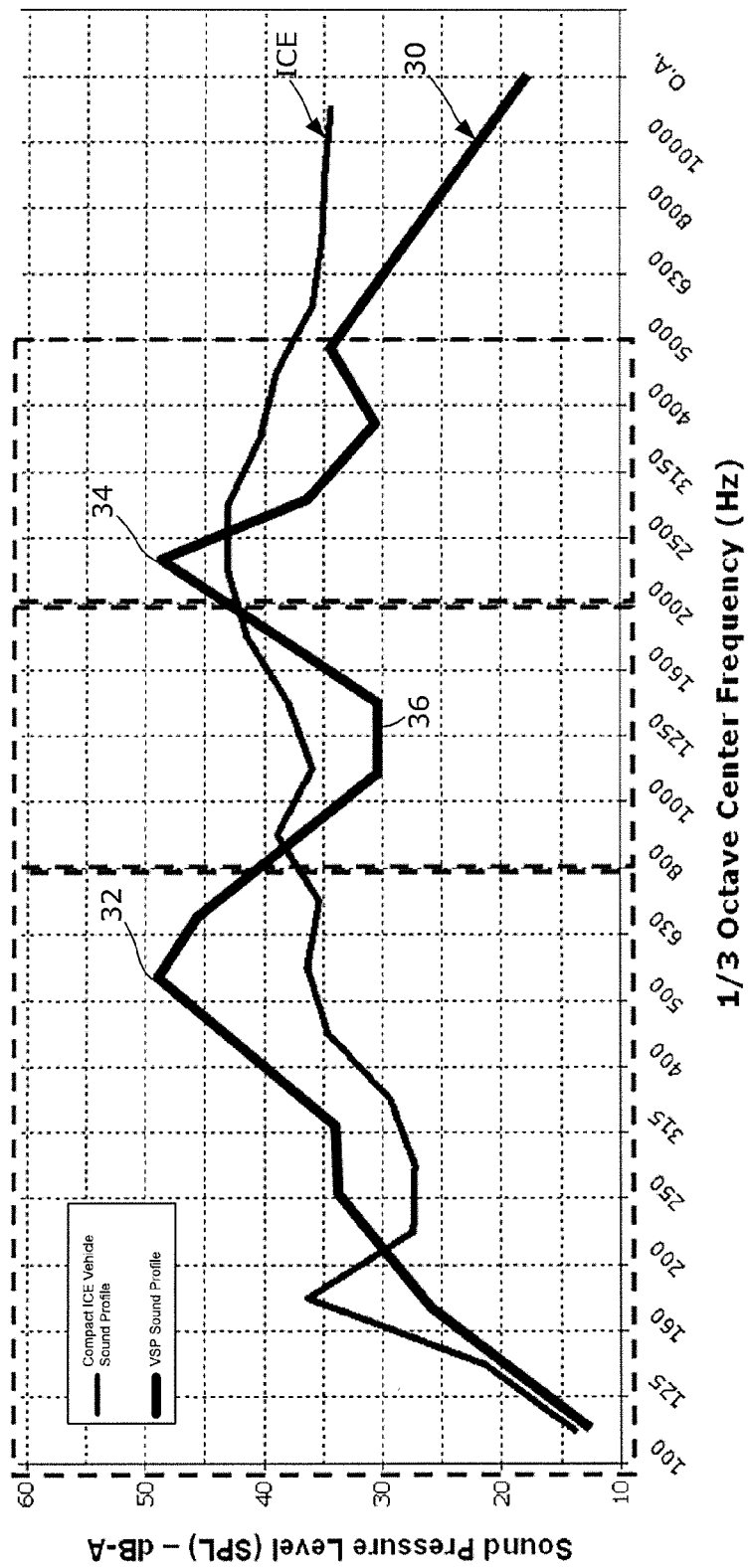
FIG. 2 is an exemplary graph in the frequency domain showing an example of the sound profile produced by the system of FIG. 1 in relation to an example of a sound profile produced by a compact ICE vehicle.
Figure 3:
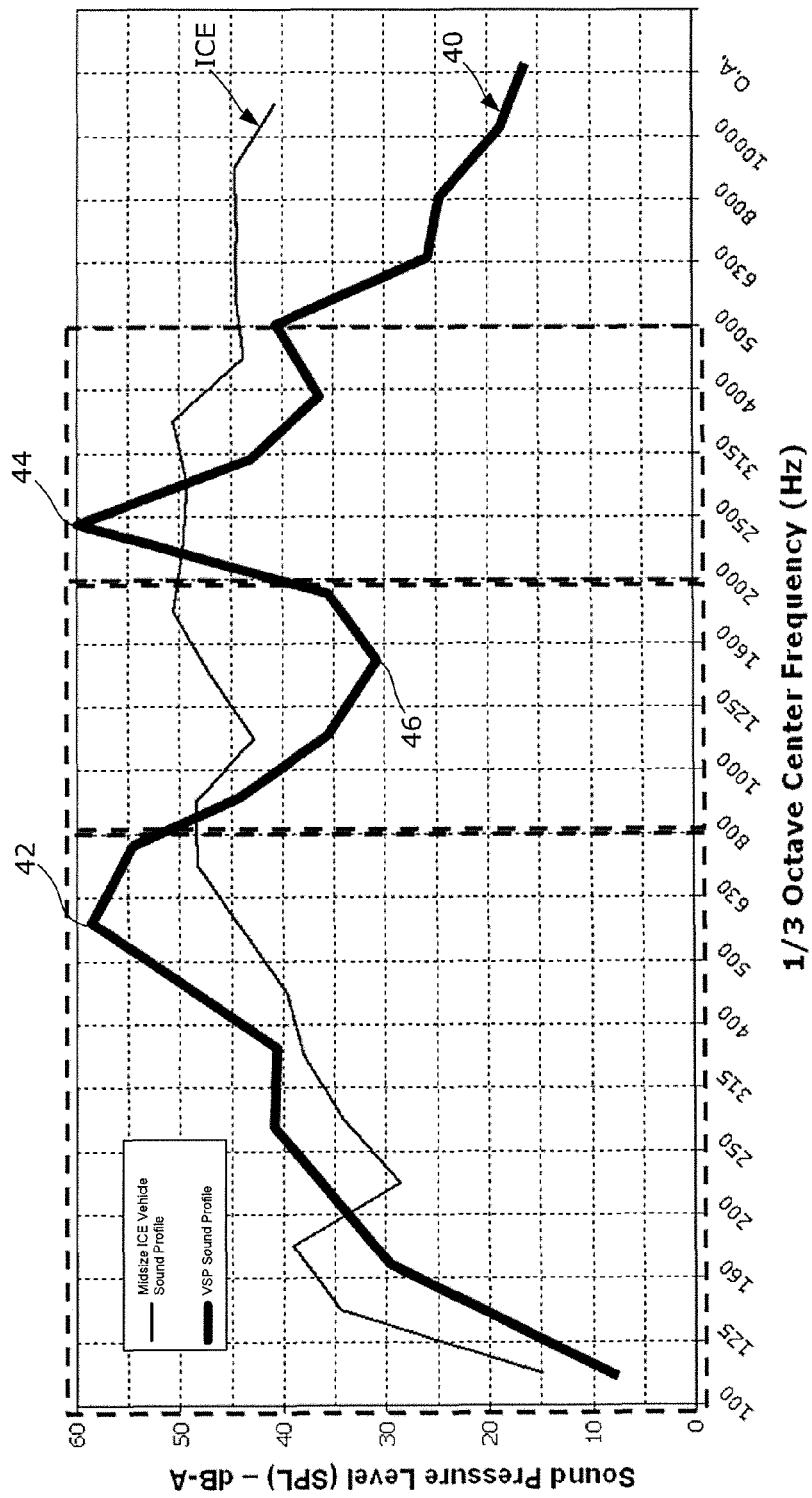
FIG. 3 is an exemplary graph in the frequency domain showing an example of the sound profile produced by the system of FIG. 1 in relation to an example of a sound profile produced by a mid-sized ICE vehicle.

FIG. 2 is an exemplary graph in the frequency domain showing an example of the VSP sound profile 30 produced by the VSP system 10 of FIG. 1 in relation to an example of a sound profile produced by a compact ICE vehicle. The vertical axis represents sound pressure level in dB(A) and the horizontal axis represents the ⅓ octave center frequency. As indicated, the VSP sound profile 30 includes a low frequency component (peak) 32, a high frequency component (peak) 34, and an ambient noise component (valley) 36. The audible alert in the example shown in FIG. 2 is thus a continuous emanation of these three frequency components simultaneously. It should also be noted that the peaks 32 and 34 are the highest points in the VSP sound profile 30, and the ambient noise component 36 is a low point in the VSP sound profile 30. Furthermore, the sound pressure level of the ambient noise component 36 is preferably zero or substantially zero (e.g., less than 1 dB(A)), in which event the audible alert is a continuous emanation of the low frequency component 32 and the high frequency component 34 simultaneously. Similarly, FIG. 3 is an exemplary graph in the frequency domain showing an example of the VSP sound profile 40 produced by the VSP system 10 of FIG. 1 in relation to an example of a sound profile produced by a mid-sized ICE vehicle. The vertical axis represents sound pressure level in dB(A) and the horizontal axis represents the ⅓ octave center frequency. As indicated, the VSP sound profile 40 includes a low frequency component (peak) 42, a high frequency component (peak) 44, and an ambient noise component (valley) 46. Hence, as with the example shown in FIG. 2, in this example shown in FIG. 3, the audible alert is thus a continuous emanation of these three frequency components simultaneously. It should also be noted that the peaks 42 and 44 are the highest points in the VSP sound profile 40, and the ambient noise component 46 is a low point in the VSP sound profile 40. Furthermore, the sound pressure level of the ambient noise component 46 is preferably zero or substantially zero (e.g., less than 1 dB(A)), in which event the audible alert is a continuous emanation of the low frequency component 42 and the high frequency component 44 simultaneously. Naturally, the VSP sound profiles 30 and 40 can have additional components (e.g., peaks and valleys) as long and they include at least the two peaks and one valley in the frequency ranges as discussed herein.

An example of a method for determining a VSP sound profile as shown in FIGS. 2 and 3 will now be described. For purposes of example, this discussion will refer to the VSP sound profile 30. However, the VSP sound profile 40 is determined in the same or substantially the same manner.

As can be appreciated from FIG. 2, the VSP sound profile 30 can be described by its frequency profile as compared to an ICE signal. In this case, the ICE signal is that which emanates from a compact vehicle. To make the comparison, the ICE sound is measured about 2 meters from the front grill when the compact vehicle is in a motive gear (e.g. drive) but is stationary to eliminate the impact of tire noise, and the cooling fan is off. The ICE sound profile is recorded. Then, the VSP system 10 in the same vehicle that is now being operated in an electric vehicle (EV) mode, or the VSP system 10 in a different similarly sized (compact) electric or hybrid vehicle, is operated and the VSP sound is measured about 2 meters from the front grill of the vehicle where the vehicle is running in a motive gear (e.g., drive) but stationary to eliminate tire noise, and the cooling fan is off. The VSP system 10 is operated so that the VSP sound is set at the same or substantially the same overall dB(A) level as the comparable ICE vehicle, and the VSP sound profile is recorded. The VSP system 10 is then controlled to achieve the desired relationship between the VSP and ICE sound profiles.

That is, instead of the VSP sound from the electric or hybrid vehicle blending in with ICE vehicle sound, the VSP sound profile is distinct and unique to electric vehicles (or hybrid vehicles operating in the EV mode). The VSP sound profile includes three distinct characteristics, as compared to the generic ICE sound profile.

Specifically, as shown in FIG. 2, the VSP sound profile 30 should include a peak dB(A) at a high audible frequency within a range of at or about 2 kHz to at or about 5 kHz (peak 34), which is detectable by the majority of pedestrians who have normal hearing. That is, for people with normal hearing, their perceptibility of sound is strongest in this range. Also, the peak 34 should be at least 3 dB(A) higher than the level of the ICE signal at that frequency to be subjectively noticeable for a non-expert. That is, it is well known in the psychoacoustics field that the "just noticeable" difference in loudness for very low intensity sounds is about 3 dB(A). Hence, if a sound is set at around 1 dB(A) and the intensity is increased by 3 dB(A), a listener would notice the increase. As sounds get louder, the "just noticeable" difference gets smaller. Therefore, for a vehicle sound with an overall sound pressure level around 40-60 dB(A), an increase or decrease in level of 3 dB(A) is noticeable. Accordingly, if the frequency component at, for example, 2.5 kHz in one signal (the VSP sound profile) is 3 dB(A) higher than in another signal, the difference between the signals will be noticeable.

The VSP sound profile 30 should further include a peak dB(A) at a low audible frequency of less than or at about 1 kHz (peak 32), which is especially detectable by pedestrians lacking the hearing ability to detect the high frequency component (e.g., the elderly) and for detection by visually impaired people who can no longer sufficiently hear high frequencies. As discussed above, people over the age of 60 typically have high frequency hearing loss characterized by a significant loss in perceptibility of sounds greater than at or about 2 kHz. The peak 32 should be at least 3 dB(A) higher than the level of the ICE signal at that frequency. The peak 32 should be within the range between 20 Hz and 800 Hz, but is most preferred to be between 315 Hz and 800 Hz where the peak would be most likely to be perceivable by pedestrians lacking the hearing ability to detect the high frequency component.

In addition, the VSP sound profile 30 should include a valley dB(A) at the ambient noise frequency of at or about 1 kHz (valley 36). The valley 36 should be at least 3 dB(A) lower than the level of the ICE signal at that frequency, and is preferably at or near 0 dB(A). This lower dB(A) at the ambient noise frequency reduces the noise created at the typical db(A) peak of ICE engines to reduce the contribution to ambient noise, and is also more detectable by the elderly and visually impaired people than the higher frequency.

In addition, although specific examples are given in FIGS. 2 and 3, it is understood in the art that ICE signals are consistently broadband in character and therefore, it is not necessary to make reference to a specific ICE signal for the embodiments of the present invention described herein.

The VSP sound profile 30 or 40 is preferably continuously emanated during operation of the vehicle. For purposes of the embodiments described herein, the terms "continuously," "continuous" and any variations or synonyms thereof as used to modify terms such as "sound profile," "sound," "signal," "emanating", "emanate" and so on refer to the outputting or emanation of a sound profile, sound or signal in a manner that is perceptible as continuous (i.e., without pauses or gaps) by a human having normal hearing. In other words, for example, "continuously emanating a sound profile" refers to the continuous emanation of a sound profile, as well as the emanation of sound profile with pauses, gaps, dead spots, etc., in a manner such that the sound profile is perceived as a continuous sound profile by a human having normal hearing even though the actual emanation is not in fact continuous. Furthermore, the sound pressure at any of the peaks or valleys in the VSP sound profiles 30 and 40, or at any of the other suitable frequencies outside of those peaks and valleys, can be modulated to enhance their audibility. That is, the sound profiles 30 and 40 can be varied over time with frequency or amplitude modulation. Preferably, the low audible frequency below 1 kHz (peak 32 of VSP sound profile 30 and peak 42 of VSP sound profile 40) can be modulated over time, or have a tempo (pulses/sec). This modulation or pulsing helps the overall signal stand out against ambient noise of similar frequency. In addition, the engine control unit 14 can control the VSP module 16 to change the pulsing or the pitch of the VSP sound profile 30 or 40 based on the speed of the vehicle 12 as measured by the speed sensor 20. For example, the engine control unit 14 can control the VSP module 16 to increase the pitch of the VSP sound profile 30 or 40 as the speed of the vehicle 12 increases, and to decrease the pitch of the VSP sound profile 30 or 40 as the speed of the vehicle 12 decreases.

Accordingly, once the VSP sound profile includes the criteria discussed above, the ECU 14 can be programmed to control the VSP module 16 of the vehicle 12 to generate this VSP sound profile at the appropriate times. Specifically, the engine control unit 14 controls the VSP module 16 to generate the sound profile 30 or 40 when the ignition switch 18 is on and the vehicle is running, the transmission position sensor 24 indicates that the vehicle 12 is in a motive gear (e.g., drive), and the speed sensor 20 indicates that the vehicle 12 is travelling forward at low speeds during which tire noise is minimal.

Hence, as discussed above, the VSP 10 controls vehicle 12 to emanate an audible alert. The engine control unit 14 (controller) determines when the vehicle is operating, and controls at least one speaker 28 (speaker system) in the vehicle 12 to emanate the audible alert outside of the vehicle for a period of time when the vehicle is operating based on stored information that is representative of an ICE noise profile. As discussed above, the audible alert has a sound profile 30 or 40 that includes a first audible frequency component 34 or 44 having a first sound pressure level that is greater than a first representative sound pressure level of the ICE noise profile at a first frequency corresponding to that of the first audible frequency component, a second audible frequency component 32 or 42 having a second sound pressure level that is greater than a second representative sound pressure level of the ICE noise profile at a second frequency corresponding to that of the second audible frequency component, and a third audible frequency component 36 or 46 having a third sound pressure level that is less than a third representative sound pressure level of the ICE noise profile at a third frequency corresponding to that of the third audible frequency component.

As can further be appreciated from the above, the third audible frequency component 36 or 46 has a frequency within an ambient noise range outside of the vehicle 12, which can be within a range between 800 Hz and 2 KHz. On the other hand, the first audible frequency component 34 or 44 is a high frequency component having a high frequency greater than frequencies of the second and third audible frequency components. The high frequency of the first audible frequency component 34 or 44 is at a frequency corresponding to an upper frequency of a normal human detectable range of frequencies, which generally is between 2 KHz and 5 KHz. Furthermore, the second audible frequency component 32 or 42 is a low frequency component having a low frequency lower than frequencies of the first and third audible frequency components. That is, the low frequency of the second audible frequency component 32 or 42 is at a frequency corresponding to a lower frequency of a normal human detectable range of frequencies, which is generally between 20 Hz and 800 Hz. In addition, the first, second and/or third sound pressure levels can be modulated to improve detection.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also, the term "detect" as used herein to describe an operation or function carried out by a component, a section, a device or the like includes a component, a section, a device or the like that does not require physical detection, but rather includes determining, measuring, modeling, predicting or computing or the like to carry out the operation or function. The term "configured" as used herein to describe a component, section or part of a device includes hardware and/or software that is constructed and/or programmed to carry out the desired function. The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A method for controlling a vehicle to emanate an audible alert, the method comprising:
   determining when the vehicle is operating; and
   controlling a speaker system in the vehicle to emanate the audible alert outside of the vehicle for a period of time when the vehicle is operating based on stored information that is representative of an internal combustion engine noise profile, such that the audible alert has a sound profile that includes a simultaneous emanation of a first audible frequency component having a first frequency emanating at a first sound pressure level that is greater than a first representative sound pressure level of the internal combustion engine noise profile at the first frequency, a second audible frequency component having a second frequency emanating at a second sound pressure level that is greater than a second representative sound pressure level of the internal combustion engine noise profile at the second frequency, and a third audible frequency component having a third frequency emanating at a third sound pressure level that is less than a third representative sound pressure level of the internal combustion engine noise profile at the third frequency.

2. The method according to claim 1, wherein the third sound pressure level is substantially zero.

3. The method according to claim 1, wherein the third frequency is within an ambient noise range outside of the vehicle.

4. The method according to claim 3, wherein the third frequency is between 800 Hz and 2 KHz.

5. The method according to claim 1, wherein the controlling controls the speaker system to emanate the first audible frequency component as a high frequency component with the first frequency being greater than the second and third frequencies.

6. The method according to claim 1, wherein the first frequency is at a frequency corresponding to an upper frequency of a normal human detectable range of frequencies.

7. The method according to claim 6, wherein the first frequency is between 2 KHz and 5 KHz.

8. The method according to claim 1, wherein the controlling controls the speaker system to emanate the second audible frequency component as a low frequency component with the second frequency being lower than the first and third frequencies.

9. The method according to claim 1, wherein the second frequency is at a frequency corresponding to a lower frequency of a normal human detectable range of frequencies.

10. The method according to claim 9, wherein the second frequency is between 20 Hz and 800 Hz.

11. A vehicle alert system comprising:
   a speaker system; and
   a controller, operable to determine when the vehicle is running, and to control the speaker system in the vehicle to emanate the audible alert outside of the vehicle for a period of time when the vehicle is operating based on stored information that is representative of an internal combustion engine noise profile, such that the audible alert has a sound profile that includes a simultaneous emanation of a first audible frequency component having a first frequency emanating at a first sound pressure level that is greater than a first representative sound pressure level of the internal combustion engine noise profile at the first frequency, a second audible frequency component having a second frequency emanating at a second sound pressure level that is greater than a second representative sound pressure level of the internal combustion engine noise profile at the second frequency, and a third audible frequency component having a third frequency emanating at a third sound pressure level that is less than a third representative sound pressure level of the internal combustion engine noise profile at the third frequency.

12. The vehicle alert system according to claim 11, wherein the third sound pressure level is substantially zero.

13. The vehicle alert system according to claim 11, wherein the third frequency is within an ambient noise range outside of the vehicle.

14. The vehicle alert system according to claim 13, wherein the third frequency is between 800 Hz and 2 KHz.

15. The vehicle alert system according to claim 11, wherein the controller is operable to control the speaker system to emanate the first audible frequency component as a high frequency component with the first frequency being greater than the second and third frequencies.

16. The vehicle alert system according to claim 11, wherein the first frequency is at a frequency corresponding to an upper frequency of a normal human detectable range of frequencies.

17. The vehicle alert system according to claim 16, wherein the first frequency is between 2 KHz and 5 KHz.

18. The vehicle alert system according to claim 11, wherein the controller is operable to control the speaker system to emanate the second audible frequency component as a low frequency component with the second frequency lower being than the first and third frequencies.

19. The vehicle alert system according to claim 11, wherein the second frequency is at a frequency corresponding to a lower frequency of a normal human detectable range of frequencies.

20. The vehicle alert system according to claim 19, wherein the second frequency is between 20 Hz and 800 Hz.

21. A method for controlling a vehicle to emanate an audible alert, the method comprising:
   determining when the vehicle is operating; and
   controlling a speaker system in the vehicle to emanate the audible alert outside of the vehicle for a period of time when the vehicle is operating based on stored information that is representative of an internal combustion engine noise profile, such that the audible alert has a sound profile that includes a simultaneous emanation of a first audible frequency component having a first frequency which is within a normal human detectable upper range of frequencies and emanates at a first sound pressure level that is greater than a first representative sound pressure level of the internal combustion engine noise profile at the first frequency, a second audible frequency component having a second frequency which is within a normal human detectable lower range of frequencies and emanates at a second sound pressure level that is greater than a second representative sound pressure level of the internal combustion engine noise profile at the second frequency, and a third audible frequency component having a third frequency that is within an ambient noise range outside of the vehicle and emanates at a third sound pressure level that is less than a third representative sound pressure level of the internal combustion engine noise profile at the third frequency.

22. The method according to claim 21, wherein the third sound pressure level is substantially zero.

23. A method for determining a vehicle sound profile, the method comprising:

operating a first test vehicle having an internal combustion engine to run while the first test vehicle is in a motive gear and is stationary;

measuring a first sound profile emanating from the first test vehicle during the operating at a first distance from the first test vehicle;

controlling a vehicle sound production system in a second test vehicle to emanate a second sound profile from the second test vehicle when the second test vehicle is running in an electric vehicle mode while in a motive gear and stationary;

measuring a second sound profile emanating from the second test vehicle during the operating at a second distance from the second test vehicle that is substantially equal to the first distance from the first test vehicle; and creating the vehicle sound profile based on the second sound profile in relation to the first sound profile.

24. The method according to claim 23, wherein the first and second test vehicles are the same vehicle, and the first and second distances are the same distance.

* * * * *